Jan. 6, 1925.
E. H. BELDEN
TIRE CARRIER
Filed Oct. 9, 1919
1,521,925
2 Sheets-Sheet 1
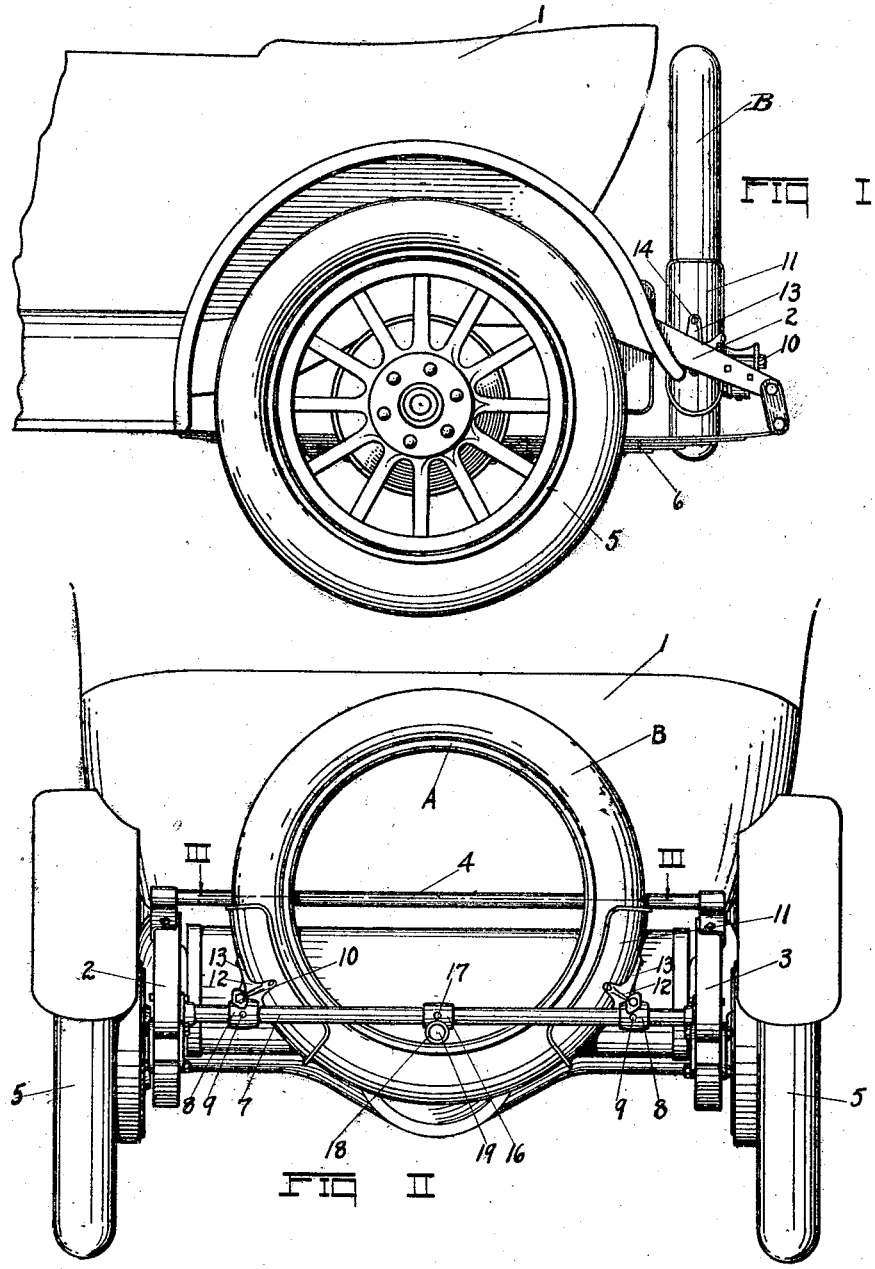
INVENTOR.
Edward H. Belden
BY Chester W. Braselton
ATTORNEY Jan. 6. 1925.
E. H. BELDEN
TIRE CARRIER
Filed Oct. 9, 1919
1,521,925
2 Sheets-Sheet 2
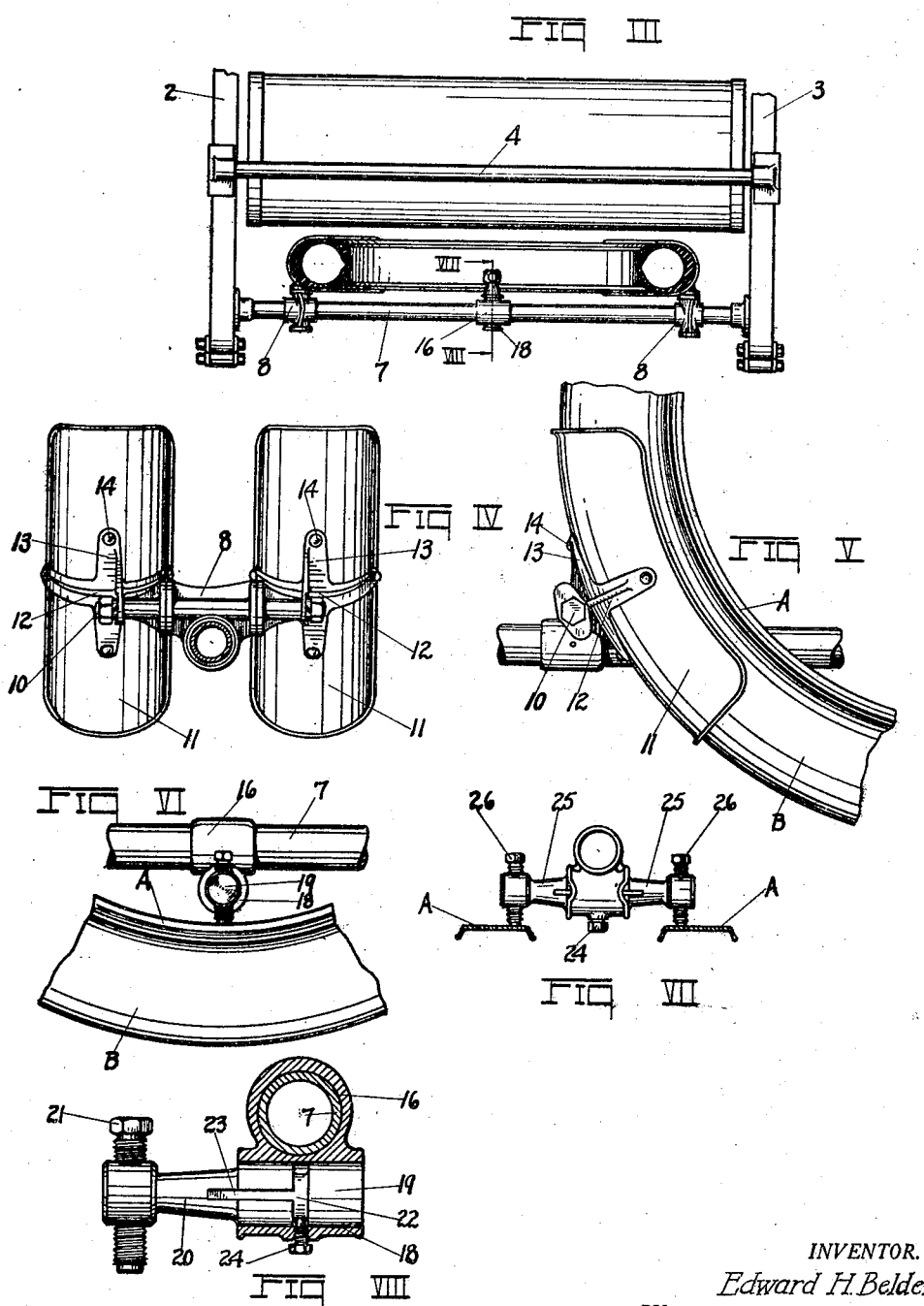
INVENTOR.
Edward H. Belden
BY Chester W. Braselton
ATTORNEY Patented Jan. 6, 1925.

1,521,925

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

TIRE CARRIER.

Application filed October 9, 1919. Serial No. 329,427.

*To all whom it may concern:*

Be it known that I, EDWARD H. BELDEN, residing at Toledo, county of Lucas, State of Ohio, have invented certain new and useful Improvements in Tire Carriers, of which I declare the following to be a full, clear, and exact description.

This invention relates to an improvement in tire carriers, particularly of the type which is adapted to be conveniently positioned near the rear end portion of the automobile and supported by the automobile frame, although the carrier may be positioned upon any other suitable portion of the automobile structure if desired.

One object of the invention is to provide a carrier which is of simple construction and efficient in operation.

A further object of the invention is to provide an improved carrier as shown herewith which is capable of being readily employed in connection with and for the purpose of supporting either one or two spare tires as may be desired.

A further object of the invention is to provide simple and readily operative means for exerting pressure upon a spare tire to force the same into engagement with the supporting members and securely retain it in position relative thereto.

Further objects of the invention relate to economies of manufacture and details of construction as will hereinafter appear from the detailed description to follow:

The objects of the invention are accomplished in one instance by the devices and means described in the following specification, but it is evident that the same may be varied widely without departing from the scope of the invention as pointed out in the appended claims. A structure constituting one embodiment of the invention is illustrated in the accompanying drawings forming a part hereof in which:

Figure I is a side elevational view of the rear end portion of an automobile body illustrating the position of the spare tire when supported by the improved tire carrier forming the subject of this application.

Figure II is a rear elevational view of the rear end portion of an automobile illustrating the relative position of the tire carrying mechanism.

Figure III is a horizontal sectional view, taken along the line III—III of Figure II and showing the position of the tire relative to the automobile frame.

Figure IV is an elevational view illustrating the position of the supporting members with respect to the cross bar, when the tire carrier employed is adapted to support two spare tires.

Figure V is a side elevational view of one of the supporting members, showing the means for securing the frame to the cross bar.

Figure VI is a side elevational view of the lower portion of the spare tire illustrating the clamping means which is employed for the purpose of forcing the tire into close engagement with the supporting member.

Figure VII is a side elevational view of the clamping members showing the position of the same when two of these members are employed for the purpose of clamping two spare tires into position relative to the supporting members.

Figure VIII is a detail sectional view, taken along the line VIII—VIII of Figure III, and illustrating the manner of supporting the clamping member within the sleeve carried by the cross bar.

In the embodiment of the invention illustrated herewith, 1 indicates the body of an automobile which may be of the usual or any desired construction, and which is provided with a frame portion including a pair of longitudinally extending side frame memers 2 and 3 extending longitudinally of the body and secured together at suitable intervals by transverse connecting members such as 4. The frame structure above described is supported by a plurality of ground engaging wheels 5 through the intermediacy of the usual spring devices 6.

A cross bar 7 which may be of tubular construction is positioned between and secured to the rearwardly extending portions of the side frame members in the manner indicated in Figures II and III of the drawings. The various devices for supporting the spare tires are preferably carried by the cross bar 7 and arranged in a suitable manner to permit the spare tires to be readily removed from the carrier and replaced thereon as conditions may require.

Suitably mounted upon the cross bar 7 at points adjacent the ends thereof are a pair of bracket members 8 which may be sleeved over the rod 7 and secured thereto in any suitably and desired manner as by being brazed thereon or held in place by means of suitable set screws 9. Each of these bracket members is provided with an opening extending therethrough in a direction substantially at right angles to the longitudinal axis of the cross bar 7, and bolts 10 are provided which are adapted to be passed through the openings formed in the bracket members and to support the supporting members 11 within which the spare tires are adapted to seat. Each of the supporting members 11 is of trough shape formation constructed so as to fit snugly against the outer circumferential surface of a tire to properly support the same. Each of the supporting members are connected with the bolts 10 by means of a suitable bracket 12 which is provided with an opening for the reception of the bolt 10, and has a plurality of radiating arms 13 to which the supporting member 11 is secured by means of rivets or other suitable fastening devices 14.

It will be observed upon reference to Figures III to V of the drawings, that the mechanism above described is so constructed as to permit the use of supporting members for carrying one or two spare tires as may be desired. The brackets 12 are preferably capable of pivoting freely upon the bolts 10 whereby the supporting members 11 are capable of accommodating themselves to the spare tires which they support. When only one spare tire is intended to be carried by the carrier the bolts 10 employed therewith are only of sufficient length to pass through the openings formed in the bracket 8 and the openings in the bracket 12, thus doing away with the necessity of retaining the outer support for the second spare tire in position upon the frame when it is desired only to carry one tire. This feature of the invention is clearly illustrated in Figure III of the drawings where the structure shown is that which is adapted to be employed when only one spare tire is to be carried, when two tires are to be supported by the carrier structure, the supporting members are oppositely positioned relative to each other as illustrated in Figure IV of the drawings, and the bolt 10 employed for supporting the oppositely positioned supporting members is of sufficiently greater length than the bolt employed in the form illustrated in Figure III so that it is capable of passing through the opening formed in the bracket 8 and also through the openings provided in the two brackets 12.

Positioned upon the cross rod 7 and located substantially midway between the brackets 8 previously described is a bracket 16 having a tubular portion adapted to be sleeved over the rod 7 and secured thereto in any suitable manner as by being brazed thereon, or secured in position relative thereto by means of a set screw 17. This bracket member is provided with a tubular opening 18 formed therein, which tubular opening extends in a direction at substantially right angles to the length of the rod 7 and within which may be positioned the cylindrical portion 19 of a clamping member 20 which is provided near one end portion thereof with a set screw 21 adapted to be forced into engagement with the inner surface of the rim A whereby the outer portion of the spare tire B is forced into close engagement with the supporting members 11 and held in position relative thereto. The cylindrical portion 19 of the clamping member 20 is provided with a circumferential groove 22 formed near the center thereof and a longitudinal groove 23 communicating therewith whereby the clamping member may be rotated about its axis for removal from engagement with the interior portion of the rim so as to permit the spare tire to be removed from the support. A set screw 24 is mounted within the cylindrical portion of the bracket 16 and has a portion projecting within the groove 22 to retain the clamping member in position against accidental movement from the cylindrical portion of the bracket.

As shown in Figure VII of the drawings, this clamping member may be constructed so as to have a portion projecting from each end of the cylindrical part thereof, and set screws 26 carried by each of the projecting portions 25 are so arranged to be capable of engagement with the inner circumferential surface of two wheel rims A when it is desired to support two spare tires from the tire carrier.

When it is desired to remove the spare tire, the clamping member 20 is rotated into such a position as to bring the longitudinal groove 23 into register with the end portion of the set screw 24 whereupon the clamping member 20 may be moved in a longitudinal direction out of the path of the spare tire B, so that the spare tire can be readily lifted from the supporting members. When it is desired to place a spare tire in position upon the carrier the tire is seated upon the supporting members 11 and the clamping member 20 which has been previously withdrawn from the path of the tire is moved longitudinally until the end of the set screw 24 is brought into register with the circular groove 22 formed in the clamping member whereupon the clamping member may be rotated into the position illustrated in Figure VIII of the drawings, and the set screw may be turned downwardly and brought into engagement with the inner surface of the spare rim to force the tire into close engagement with the supporting member and clamp the same in position relative thereto.

While I have shown and described in considerable detail a specific embodiment of my invention, it is to be understood that this showing and description is illustrative only and for the purpose of rendering my invention more clear, and that I do not regard this invention as limited to the details of construction illustrated or described except in so far as I have included such limitations within the terms of the following claims, in which it is my intention to claim all novely inherent in my invention broadly as well as specifically.

What I claim as new and desire to secure by Letters Patent is:—

1. In a device of the character described, a vehicle frame including a pair of longitudinally extending side frame members, a bar connecting said side frame members, a pair of supports provided with portions fitting the outer surface of the tire and pivotally mounted upon the connecting bar for supporting a spare tire, and means arranged intermediate said supports for engaging the inner surface of the rim upon which the tire is mounted to force the tire into close engagement with the supports and retain the same in position relative thereto.

2. In a device of the character described, a frame including a horizontal bar, a pair of supports pivotally mounted thereon for engaging outer portions of a tire, clamping means carried by said bar intermediate said supports comprising a member movable into and out of the plane of said tire and adapted to engage an inner portion thereof for clamping the tire against said supports.

3. In a device of the character described, a frame, a bar carried thereby, oppositely positioned supports carried by the bar and extending from either side thereof, a sleeve on said bar and located between the oppositely extending supports, and means carried by the sleeve and projecting in opposite directions therefrom for retaining a spare tire in place upon each side of the bar, said means being bodily removable laterally on said bar to permit the removal of either tire.

4. A tire carrier comprising a bar, a pair of supports carried thereby for holding a spare tire, a member arranged between said supports to clamp said tire there against and means for sliding said last member laterally into and out of alinement with said supports.

5. In a convertible tire carrier, supporting devices for each of a pair of tires, and means whereby the supporting devices for each tire may be removed independently of the supporting devices of the other tire whereby the carrier is capable of conversion from a double tire carrier to a single tire carrier or vice versa.

6. In a convertible tire carrier, a supporting rod, a plurality of brackets carried by said rods, tire supporting and clamping members carried by said brackets, the said clamping members being placed intermediate said supports and provided with groves, the said grooves being adapted to permit a longitudinal movement to the clamping members.

7. In a convertible tire carrier, a supporting rod, a plurality of brackets carried by said rods, tire supporting and clamping members carried by said brackets, the said clamping members being placed intermediate said supports and provided with a circular groove, the said groove being adapted to permit of a rotatable movement of the clamping member.

8. In a convertible tire carrier, a supporting rod, a plurality of brackets carried by said rods, tire supporting and clamping members carried by said brackets, the said clamping members being placed intermediate said supports and provided with grooves, the said grooves being adapted to permit a longitudinal and rotative movement to the clamping member.

9. In a device of the character described, a frame, a pair of pivotally mounted supports thereon to conform to and engage the outer surface of a tire, and a removable clamping member positioned intermediate said supports for clamping said tire firmly against said supports.

10. In a tire carrier, a supporting rod, tire supporting members mounted on said rod and a tire clamping member mounted on said rod intermediate said supporting members to have sliding movement at right angles to said tire to facilitate the removal thereof.

11. In a device of the class described, a rod adapted for connection to the side frame members of a vehicle, three separate cooperating tire holding members directly mounted upon the rod intermediate its ends, two of said members being adapted to engage the outer portion of a spare tire to form a support for said tire, and the other serving to maintain the tire upon said supports.

12. In a device of the class described, a rod adapted for connection to the side frame members of a vehicle, three separate cooperating tire holding members directly mounted upon the rod intermediate its ends, two of said members being adapted to engage the outer portion of a spare tire to form a support for the tire, and the other being adjustable transversely thereof into clamping engagement therewith.

13. In a device of the class described, a rod adapted for connection to the side frame members of a vehicle, a pair of trough-shaped members independently mounted upon said rod intermediate its ends and adapted to engage the outer portion of a tire, whereby to support said tire in an upright position, and means upon the rod intermediate said trough-shaped members adapted to secure the tire therein.

14. In a device of the class described, a rod adapted for connection to the side frame members of a vehicle, two tire holding brackets independently mounted upon said rod intermediate its ends and adapted to support a tire through engagement with the outer portion thereof, and a securing device upon the rod intermediate said brackets including a portion adapted to be adjusted into position to engage and clamp the tire upon said brackets.

15. In combination, a rod adapted for connection to the side frame members of a motor vehicle, brackets independently mounted upon the rod adjacent the ends thereof, tire supporting members curved to receive the outer peripheral portions of the tires to be carried thereby, and means for detachably securing said tire supporting members to said brackets, whereby the structure may be employed to support either one or two tires.

16. In combination, a rod adapted for connection to the side frame members of a motor vehicle, brackets independently mounted upon the rod adjacent the ends thereof, tire supporting members curved to receive the outer peripheral portions of the tires, interchangeable means carried by said brackets for detachably securing the supporting members selectively to the brackets upon one or both sides of the rod whereby either one or two spare tires may be supported by the brackets, and means for clamping the tire upon the brackets.

In testimony whereof, I affix my signature.

EDWARD H. BELDEN.